United States Patent
Huang et al.

(10) Patent No.: US 10,647,902 B1
(45) Date of Patent: May 12, 2020

(54) TEMPORARY PLUGGING AGENT FOR DRILLING FLUID AND PREPARATION METHOD THEREOF, AND WATER-BASED DRILLING FLUID AND USE THEREOF

(71) Applicant: China University of Petroleum (East China), Qingdao (CN)

(72) Inventors: Weian Huang, Qingdao (CN); Jingwen Wang, Qingdao (CN); Ming Lei, Qingdao (CN); Jiaqi Zhang, Qingdao (CN); Gongrang Li, Qingdao (CN); Kaihe Lv, Qingdao (CN); Xiongjun Wu, Qingdao (CN); Zhengsong Qiu, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/394,753

(22) Filed: Apr. 25, 2019

(30) Foreign Application Priority Data

Jan. 14, 2019 (CN) .......................... 2019 1 0031987

(51) Int. Cl.
*C09K 8/08* (2006.01)
*C09K 8/42* (2006.01)
*C09K 8/12* (2006.01)

(52) U.S. Cl.
CPC .................. *C09K 8/08* (2013.01); *C09K 8/12* (2013.01); *C09K 8/426* (2013.01)

(58) Field of Classification Search
CPC ............. C09K 8/08; C09K 8/12; C09K 8/426
See application file for complete search history.

(56) References Cited

U.S. PATENT DOCUMENTS

2006/0047068 A1* 3/2006 Doane .................... A01G 13/02
525/54.3

FOREIGN PATENT DOCUMENTS

| CN | 104449613 A | 3/2015 |
| CN | 104710967 A | 6/2015 |
| CN | 106883832 A | 6/2017 |

* cited by examiner

*Primary Examiner* — Aiqun Li
(74) *Attorney, Agent, or Firm* — Volpe and Koenig, P.C.

(57) ABSTRACT

The present invention discloses temporary plugging agent for drilling fluid and preparation method thereof, and water-based drilling fluid and use thereof. The temporary plugging agent for drilling fluid is obtained by controlling gelatinized starch and a vinyl grafted monomer to have a polymerization reaction in an activator solution in the presence of a cross-linking agent and an initiator; the vinyl grafted monomer comprises acrylic acid, acrylamide, and 2-acrylamide-2-methyl propanesulfonic acid; the gelatinized starch is obtained by adding starch into deionized water to have a gelatinization reaction.

17 Claims, No Drawings

TEMPORARY PLUGGING AGENT FOR DRILLING FLUID AND PREPARATION METHOD THEREOF, AND WATER-BASED DRILLING FLUID AND USE THEREOF

CROSS COMPARATIVE TO RELATED APPLICATIONS

The application claims priority to Chinese Application No. 201910031987.6, field on Jan. 14, 2019, entitled "temporary plugging agent for drilling fluid and preparation method thereof, and water-based drilling fluid and use thereof", which is specifically and entirely incorporated herein by comparative.

FIELD OF THE INVENTION

The present invention relates to the technical field of temporary plugging with environment-friendly drilling fluid in petroleum drilling process, particularly to a temporary plugging agent for drilling fluid, a preparation method of the temporary plugging agent for drilling fluid, a water-based drilling fluid, and an application thereof.

BACKGROUND OF THE INVENTION

Shielded temporary plugging is a reservoir protection technique widely applied in well drilling and completion processes. The shielded temporary plugging technique is to add a temporary plugging agent into the drilling fluid to form a dense temporary plugging layer, so as to prevent reservoir damaged incurred by invasion of the solid phase and liquid phase in the drilling fluid into the reservoir. The temporary plugging agent can form a high-quality temporary plugging zone only if it perfectly matches with the pore throat diameter of the formation, but it is very difficult to realize perfect match in the actual production process. Consequently, a selected temporary plugging agent is only applicable to a specific well section, but attains a poor temporary plugging effect if it is used throughout the oil and gas formation. To mitigate that problem, adaptive shielded temporary plugging agents have been developed. Such adaptive shielded temporary plugging agents employ polymers as the primary component, and utilize deformable elastic particles and packing and strengthening agents as auxiliary agents. However, many new polymeric temporary plugging agents have poor biodegradability, which results in environmental protection problems.

Water-absorbent resins are a sort of new macromolecular functional materials. They are polymers that swell but are not dissolved in water, have three-dimensional mesh structures that are at certain degree of cross-linking, have deformability, and can be used to plug up pore canals in different sizes by means of shape adjustment. Presently, water-absorbent resins have been widely applied in oil development, but they have drawbacks such as poor degradability and high toxicity, etc.

Starch-based water-absorbent resins use starch as the main chain. Starch-grafted polymers that use vinyl polymers containing a large quantity of hydrophilic groups as side chains can be used as super absorbent resins, which have unique properties of swelling while absorbing water and degradability. Those properties bring a new clue for the technique of degradable starch-based water-absorbent resin temporary plugging agent for drilling fluid. Starch is a renewable resource, has active hydroxyl groups in starch molecules, and is easy to be modified chemically and physically. Modified starch-based materials have biodegradability. Besides, acid-dissoluble rigid particles may be adulterated in starch-based water-absorbent resins to form organic-inorganic hybrid grid structures and thereby improve the overall properties of the water-absorbent resins. Therefore, starch-based water-absorbent resins are a sort of potential environment-friendly temporary plugging materials for drilling fluids.

CN104449613A has disclosed a water-absorbent resin temporary plugging agent and preparation method thereof. The water-absorbent resin temporary plugging agent is prepared from an acrylic monomer, an acrylamide monomer, and an acid-dissoluble inorganic packing material in powder form. The water-absorbent resin may be used for plugging leaking channels in different shapes and different sizes, but is non-biodegradable.

CN104710967A has disclosed a self-removing temperature-resistant temporary plugging agent for water-based drilling fluid and preparation method thereof. The temporary plugging agent consists of a product obtained through reactions of starch, alkali hydroxide, halogen organic acid, carbonate, hydrophobic modifier, alcohol and water, and nanometer calcium carbonate, has high temperature-resistance property, and can attain a good temporary plugging effect for well cores different in permeability, but its constituents contain benzene rings, which are difficult to biodegrade.

CN106883832A has disclosed an environment-friendly controllable temporary plugging agent and preparation method thereof. The temporary plugging agent is applicable to shale gas extraction, utilizes environment-friendly raw materials, and has good biocompatibility, but don't have adaptive temporary plugging ability for well cores different in permeability.

In summary, existing temporary plugging agents don't have environment friendliness as well as adaptive temporary plugging ability, and most of them are used in profile modification, water plugging, or fracturing techniques. There is no report on any temporary plugging agent for drilling fluid that has environment friendliness as well as adaptive temporary plugging ability in China yet.

Therefore, it is of great significance to develop a temporary plugging agent that has environment friendliness as well as adaptive plugging ability for formations different in permeability.

SUMMARY OF THE INVENTION

To overcome the drawback that the existing temporary plugging agents can't provide environmental protection while achieving adaptive plugging for formations different in permeability in the prior art, the present invention provides a temporary plugging agent for drilling fluid, a preparation method of the temporary plugging agent for drilling fluid, a water-based drilling fluid, and use thereof, wherein the temporary plugging agent can provide environmental protection while achieving adaptive plugging for formations different in permeability.

To attain the above object, in a first aspect, the present invention provides a temporary plugging agent for drilling fluid, which is obtained by controlling gelatinized starch and a vinyl grafted monomer to have a polymerization reaction in an activator solution in the presence of a cross-linking agent and an initiator; wherein the vinyl grafted monomer comprises acrylic acid, acrylamide, and 2-acrylamide-2- methyl propanesulfonic acid; the gelatinized starch is obtained by adding starch into deionized water to have a gelatinization reaction.

In a second aspect, the present invention provides a method for preparing the above-mentioned temporary plugging agent, comprising:

(1) adding starch into deionized water to have a gelatinization reaction to obtain gelatinized starch;
(2) controlling an activator to contact with carbonic acid to obtain an activator solution; and
(3) controlling the gelatinized starch and the vinyl grafted monomer to have a polymerization reaction in the activator solution in the presence of a cross-linking agent and an initiator.

In a third aspect, the present invention provides a water-based drilling fluid, which contains the above-mentioned temporary plugging agent or the temporary plugging agent prepared with the above-mentioned method; preferably, based on the total weight of 100 mL water-based drilling fluid, the content of the temporary plugging agent is 0.5-1.5 wt %.

In a fourth aspect, the present invention provides a method of during drilling in oil and gas fields, wherein use of the above-mentioned temporary plugging agent or the temporary plugging agent prepared with the above-mentioned method.

With the above technical scheme, the temporary plugging agent provided in the present invention is biodegradable, can be degraded by 50% or more within 90 days in soil, and is environment friendly; a water-based drilling fluid with the temporary plugging agent has excellent rheological and filtrate loss properties, and can achieve 100% adaptive temporary plugging for formations different in permeability; besides, the temporary plugging agent provided in the present invention has high acid dissolubility, and the permeability recovery ratio can be 85% or higher after acidified plugging removal. Therefore, the temporary plugging agent has outstanding reservoir protection performance. The temporary plugging agent provided in the present invention is a temporary plugging agent for drilling fluid, which has environment friendliness as well as high-performance adaptive plugging ability.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provides a temporary plugging agent for drilling fluid, which is obtained by controlling gelatinized starch and a vinyl grafted monomer to have a polymerization reaction in an activator solution in the presence of a cross-linking agent and an initiator; wherein the vinyl grafted monomer comprises acrylic acid, acrylamide, and 2-acrylamide-2-methyl propanesulfonic acid; the gelatinized starch is obtained by adding starch into deionized water to have a gelatinization reaction.

According to the present invention, the conditions of the gelatinization reaction include: heating for 20-40 min. in a water solution at 60-80° C.

According to the present invention, the starch may be maize starch.

According to the present invention, based on 100 parts by weight deionized water, the starch is in 1-5 parts by weight, the vinyl grafted monomer is in 5-9 parts by weight, the initiator is in 0.5-1 parts by weight, the cross-linking agent is in 0.2-1 parts by weight, and the activator is in 0.1-3 parts by weight;

Preferably, the mass ratio of the acrylic acid to the acrylamide to the 2-acrylamide-2-methyl propanesulfonic acid is (0.5-4):(0.5-2):1, more preferably is (0.5-2):(0.5-2):1.

According to the present invention, by controlling the contents of the components strictly, the components can interact with each other so that the prepared temporary plugging agent can exerts its best efficacy, and thereby the prepared temporary plugging agent for drilling fluid is biodegradable and environment friendly; a water-based drilling fluid with the temporary plugging agent has excellent rheological and filtrate loss properties, and can achieve adaptive temporary plugging for formations different in permeability; in addition, the temporary plugging agent provided in the present invention has high acid dissolubility, and the permeability recovery ratio can be higher after acidified plugging removal, and the temporary plugging agent has outstanding reservoir protection performance. However, a better effect can be attained if the starch is in 1-3 parts by weight, the vinyl grafted monomer is in 5-9 parts by weight, the initiator is in 0.5-1 parts by weight, the cross-linking agent is in 0.5-1 parts by weight, and the activator is in 1-2 parts by weight, based on 100 parts by weight deionized water.

According to the present invention, the cross-linking agent may be N,N-dimethylacrylamide. In the present invention, the strength of the temporary plugging agent will be too low if the amount of the cross-linking agent is too small; the swelling ratio of the temporary plugging agent will be too small if the amount of the cross-linking agent is too great. Therefore, the effect is the best under the conditions of the defined cross-linking agent and the defined content of the cross-linking agent in the present invention.

Preferably, the initiator may be ammonium persulfate. In the present invention, the content of the initiator must be controlled, because the initiator not only has influence on the speed of the polymerization reaction, but also has influence on the mesh structures of the polymer molecules; if the amount of the initiator is too small, the quantity of free radicals in the reaction system will be too low, and consequently the cross-linking density will be low, it will be difficult to form a three-dimensional mesh structure, the molecular weight of the synthesized polymer will be low, and the water absorptivity will be low. If the amount of the initiator is too great, though the speed of the polymerization reaction can be increased, the excessive initiator may result in an explosive polymerization phenomenon, and consequently the molecular weight will be decreased, the cross-linking density will be too high, it will be difficult to form a three-dimensional mesh structure, and the water absorptivity will be decreased. Therefore, the effect is the best under the conditions of the defined initiator and the defined content of the initiator in the present invention.

According to the present invention, the activator solution is obtained by controlling an activator to contact with calcium carbonate; in addition, based on 100 parts by weight deionized water, calcium carbonate is in 1-5 parts by weight, preferably is in 3-5 parts by weight;

Preferably, the activator is at least one of hexadecyl trimethyl ammonium bromide, gemini surfactant, silicone surfactant, octyl dihydroxyethoxyamine, ditetradecyl sulphobetaine, and sodium stearate; in the present invention, the gemini surfactant may be selected from one or more of cationic gemini surfactants, preferably is a gemini quaternary ammonium surfactant; the silicone surfactant may be selected from cationic silicone surfactants and/or non-cationic silicone surfactants, preferably is ethoxy modified trisiloxane.

Preferably, calcium carbonate is in 5-25 μm average particle diameter and/or in 30-100 nm average particle diameter; namely, in the present invention, the calcium carbonate may be calcium carbonate in 5-25 μm average particle diameter, or calcium carbonate in 30-100 nm average particle diameter, or a mixture of calcium carbonate in 5-25 μm average particle diameter and calcium carbonate in 30-100 nm average particle diameter; wherein in the case that the calcium carbonate is a mixture of calcium carbonate in 5-25 μm average particle diameter and calcium carbonate in 30-100 nm average particle diameter, the mass ratio of the content of the calcium carbonate in 5-25 μm average particle diameter to the content of the calcium carbonate in 30-100 nm average particle diameter is 1-2:1; more preferably, the calcium carbonate is calcium carbonate in 30-100 nm average particle diameter. In the present invention, the nanometer calcium carbonate has high activation energy, and serves as a part of the water-absorbent resin structure to participate in the reaction in the synthesis process; the water-absorbent resin structure is destroyed at a high degradation ratio in the acidolysis process.

In a second aspect, the present invention provides a method for preparing the above-mentioned temporary plugging agent, comprising:
(1) adding starch into deionized water to have a gelatinization reaction to obtain gelatinized starch;
(2) controlling an activator to contact with carbonic acid to obtain an activator solution; and
(3) controlling the gelatinized starch and the vinyl grafted monomer to have a polymerization reaction in the activator solution in the presence of a cross-linking agent and an initiator.

According to the present invention, in the step (1), the starch is dissolved in water, the solution is placed in a reaction vessel, an stirring device is started, nitrogen is charged to remove the oxygen in the flask, and the starch is gelatinized for 20-40 min. at 60-80° C., preferably gelatinized for 30 min. at 70° C.

According to the present invention, in the step (2), the activator solution is prepared, calcium carbonate is added slowly in droplets at 2-3 g/min. dropwise adding rate into the activator solution under a stirring condition at 600-1,000 rpm stirring rate, and then the solution is poured into the reaction vessel after it becomes stable.

According to the present invention, in the step (3), the conditions of the polymerization reaction include: the vinyl grafted monomer, the initiator and the cross-linking agent are dissolved in water respectively, the temperature of the system is adjusted to 40-60° C., preferably 50° C.; the initiator is added into the system to pre-initiate the system for 10-20 min., preferably for 15 min.; then the vinyl grafted monomer and the cross-linking agent are added into the system sequentially, and the reaction time is controlled to 2-4 h, preferably 3 h.

According to the present invention, the preparation method further comprises: mixing the product prepared in the step (3) with acetone and purified in a Soxhlet extractor for 9-11 h, preferably for 10 h; then the extract is washed with ethanol, dried at 60-80° C., preferably at 70° C., and milled and screened, so as to obtain the expected product.

In a third aspect, the present invention provides a water-based drilling fluid, which contains the above-mentioned temporary plugging agent or the temporary plugging agent prepared with the above-mentioned method;

Preferably, based on the total weight of 100 mL water-based drilling fluid, the content of the temporary plugging agent is 0.5-1.5 wt %.

In addition, the water-based drilling fluid may further contain one or more of water, tackifier, filtrate reducer, plugging and anti-collapse agent, inhibitor, lubricant, and anti-water blocking agent.

According to the present invention, based on the total weight of 100 mL water-based drilling fluid, the tackifier is in 0.1-0.2 parts by weight, the filtrate reducer is in 1-2 parts by weight, the inhibitor is in 2-3 parts by weight, the plugging and anti-collapse agent is in 1-2 parts by weight, the lubricant is in 1-2 parts by weight, and the anti-water blocking agent is in 0.1-0.2 parts by weight.

In a fourth aspect, the present invention provides a method of during drilling in oil and gas fields, wherein use of the above-mentioned temporary plugging agent or the temporary plugging agent prepared with the above-mentioned method.

Hereunder the present invention will be detailed in embodiments.

In the following embodiments, the water absorptivity parameter is measured with a weighing method; the biological degradability parameter is measured by chemical oxygen demand and biological oxygen demand testing; the rheological property and filtrate loss property of the drilling fluid are tested as per the standard GB/T 16783; the bearing capacity parameter is measured in a sand bed leakage test; the permeability parameter is tested as per the standard SY/T 6540-2002.

The maize starch raw material is a commercial product S116030 from Shanghai Aladdin Bio-Chem Technology Co., Ltd.; the acrylamide raw material is a commercial product A108465 from Shanghai Aladdin Bio-Chem Technology Co., Ltd.; the acrylic acid raw material is a commercial product A103525 from Shanghai Aladdin Bio-Chem Technology Co., Ltd.; the 2-acrylamide-2-methyl-1-propanesulfonate(2-acrylamide-2-methyl propanesulfonic acid) raw material is a commercial product A106798 from Shanghai Aladdin Bio-Chem Technology Co., Ltd.; the ammonium persulfate raw material is a commercial product 10002616 from Sinopharm Chemical Reagent Co., Ltd.; the N,N-dimethylacrylamide raw material is a commercial product S14607203 from Sinopharm Chemical Reagent Co., Ltd.; the calcium carbonate is a commercial product from Shanghai Yuanjiang Chemical Co., Ltd.; the sodium hydroxide raw material is a commercial product 10019762 from Sinopharm Chemical Reagent Co., Ltd.; the silicone surfactant raw material is a commercial product BD3077 from Hangzhou Bald Advanced Materials Co., Ltd.; the sodium stearate raw material is a commercial product 30169427 from Sinopharm Chemical Reagent Co., Ltd.; the hexadecyl trimethyl ammonium bromide raw material is a commercial product 30037416 from Sinopharm Chemical Reagent Co., Ltd.; the ditetradecyl sulphobetaine raw material is a commercial product from Shanghai Promise Song Industry Co., Ltd.; the octyl dihydroxyethoxyamine raw material is a commercial product from Shanghai Promise Song Industry Co., Ltd.; the gemini surfactant raw material is a commercial product from Shanghai Promise Song Industry Co., Ltd.

Example 1

This example is provided to describe the temporary plugging agent and the preparation method of the temporary plugging agent provided in the present invention.

2 g maize starch is dissolved in 50 g water, the solution is placed in a 250 mL three-neck flask, and is gelatinized for 30 min. at pH=7 at 70° C.; 1 g sodium stearate is added into 50 g water to prepare an activator solution, 2.4 g calcium carbonate in 80 nm average particle diameter is added slowly into the activator solution while the activator solution is stirred at high speed, and then the activator solution is transferred into a three-neck flask after it becomes stable; the temperature of the system is adjusted to 50° C., 0.5 g ammonium persulfate is added into the system and the system is pre-initiated for 15 min., then 2 g acrylic acid, 4 g acrylamide, 2 g 2-acrylamide-2-methyl propanesulfonic acid, and 0.5 g N,N-dimethylacrylamide are added, and the reaction time is controlled to 3 h to obtain a product; the product is mixed with acetone, and is purified for 10 h in a Soxhlet extractor, then the purified product is washed with ethanol, dried at 70° C., milled and screened; thus, a degradable starch-based temporary plugging agent for drilling fluid is obtained and marked as S1.

Example 2

This example is provided to describe the temporary plugging agent and the preparation method of the temporary plugging agent provided in the present invention.

2.5 g maize starch is dissolved in 50 g water, the solution is placed in a 250 mL three-neck flask, and is gelatinized for 30 min. at pH=7 at 70° C.; 1 g gemini quaternary ammonium surfactant is added into 50 g water to prepare an activator solution, 1.6 g calcium carbonate in 8.5 μm average particle diameter is added slowly into the activator solution while the activator solution is stirred at high speed, and then the activator solution is transferred into a three-neck flask after it becomes stable; the temperature of the system is adjusted to 50° C., 0.5 g ammonium persulfate is added into the system and the system is pre-initiated for 15 min., then 3 g acrylic acid, 3 g acrylamide, 1.5 g 2-acrylamide-2-methyl propanesulfonic acid, and 0.5 g N,N-dimethylacrylamide are added, and the reaction time is controlled to 3 h to obtain a product; the product is mixed with acetone, and is purified for 10 h in a Soxhlet extractor, then the purified product is washed with ethanol, dried at 70° C., milled and screened; thus, a degradable starch-based temporary plugging agent for drilling fluid is obtained and marked as S2.

Example 3

This example is provided to describe the temporary plugging agent and the preparation method of the temporary plugging agent provided in the present invention.

2 g maize starch is dissolved in 50 g water, the solution is placed in a 250 mL three-neck flask, and is gelatinized for 30 min. at pH=7 at 70° C.; 1 g hexadecyl trimethyl ammonium bromide is added into 50 g water to prepare an activator solution, 1.6 g calcium carbonate in 25 μm average particle diameter is added slowly into the activator solution while the activator solution is stirred at high speed, and then the activator solution is transferred into a three-neck flask after it becomes stable; the temperature of the system is adjusted to 50° C., 0.5 g ammonium persulfate is added into the system and the system is pre-initiated for 15 min., then 3.2 g acrylic acid, 3.2 g acrylamide, 1.6 g 2-acrylamide-2-methyl propanesulfonic acid, and 0.5 g N,N-dimethylacrylamide are added, and the reaction time is controlled to 3 h to obtain a product; the product is mixed with acetone, and is purified for 10 h in a Soxhlet extractor, then the purified product is washed with ethanol, dried at 70° C., milled and screened; thus, a degradable starch-based temporary plugging agent for drilling fluid is obtained and marked as S3.

Example 4

This example is provided to describe the temporary plugging agent and the preparation method of the temporary plugging agent provided in the present invention.

A temporary plugging agent is prepared with the preparation method described in the example 1, except for the following difference: the sodium stearate is replaced with ethoxy modified trisiloxane (a silicone surfactant); thus, a degradable starch-based temporary plugging agent for drilling fluid is obtained, and marked as S4.

Example 5

This example is provided to describe the temporary plugging agent and the preparation method of the temporary plugging agent provided in the present invention.

A temporary plugging agent is prepared with the preparation method described in the example 1, except for the following difference: the sodium stearate is replaced with octyl dihydroxyethoxyamine; thus, a degradable starch-based temporary plugging agent for drilling fluid is obtained, and marked as S5.

Example 6

This example is provided to describe the temporary plugging agent and the preparation method of the temporary plugging agent provided in the present invention.

A temporary plugging agent is prepared with the preparation method described in the example 1, except for the following difference: the sodium stearate is replaced with ditetradecyl sulphobetaine; thus, a degradable starch-based temporary plugging agent for drilling fluid is obtained, and marked as S6.

Example 7

This example is provided to describe the temporary plugging agent and the preparation method of the temporary plugging agent provided in the present invention.

A temporary plugging agent is prepared with the preparation method described in the example 1, except for the following difference: the calcium carbonate is replaced with calcium a mixture of calcium carbonate in 5 μm average particle diameter and calcium carbonate in 80 nm average particle diameter, and the mass ratio of the calcium carbonate in 5 μm average particle diameter to the calcium carbonate in 80 nm average particle diameter is 1:1; thus, a degradable starch-based temporary plugging agent for drilling fluid is obtained, and marked as S7.

Example 8

This example is provided to describe the temporary plugging agent and the preparation method of the temporary plugging agent provided in the present invention.

A temporary plugging agent is prepared with the preparation method described in the example 1, except for the following difference: the mass ratio of the acrylic acid to the acrylamide to the 2-acrylamide-2-methyl propanesulfonic acid is 0.5:0.5:1; thus, a degradable starch-based temporary plugging agent for drilling fluid is obtained, and marked as S8.

Comparative Example 1

A commercial water-dissoluble temporary plugging agent FC-9 is used, and marked as D1.

Comparative Example 2

A commercial oil-dissoluble temporary plugging agent TJ-1 is used, and marked as D2.

Comparative Example 3

A commercial unidirectional pressure blocking agent DF-1 is used, and marked as D3.

Comparative Example 4

A temporary plugging agent is prepared with the preparation method described in the example 1, except for the following difference: the vinyl grafted monomer includes acrylic acid and acrylamide, without 2-acrylamide-2-methyl propanesulfonic acid; thus, a temporary plugging agent for drilling fluid is used, and marked as D4.

Comparative Example 5

A temporary plugging agent is prepared with the preparation method described in the example 1, except for the following difference: the vinyl grafted monomer includes 2-acrylamide-2-methyl propanesulfonic acid and acrylamide, without acrylic acid; thus, a temporary plugging agent for drilling fluid is used, and marked as D5.

Comparative Example 6

A temporary plugging agent is prepared with the preparation method described in the example 1, except for the following difference: the vinyl grafted monomer includes acrylic acid and 2-acrylamide-2-methyl propanesulfonic acid, without acrylamide; thus, a temporary plugging agent for drilling fluid is used, and marked as D6.

Comparative Example 7

A temporary plugging agent is prepared with the preparation method described in the example 1, except for the following difference: the mass ratio of the acrylic acid to the acrylamide to the 2-acrylamide-2-methyl propanesulfonic acid is 4:4:1; thus, a temporary plugging agent for drilling fluid is used, and marked as D7.

Comparative Example 8

A temporary plugging agent is prepared with the preparation method described in the example 1, except for the following difference: the calcium carbonate is not activated; thus, a temporary plugging agent for drilling fluid is used, and marked as D8.

Comparative Example 9

A temporary plugging agent is prepared with the preparation method described in the example 1, except for the following difference: starch is not added; thus, a temporary plugging agent for drilling fluid is used, and marked as D9.

Test Case 1

Water Absorptivity and Acid Dissolubility

Distilled water absorption multiple and acid dissolubility are used as the evaluation indexes. Wherein the water absorption multiple=(weight after water absorption−weight of the product in the present invention)/weight of the product in the present invention; acid dissolubility=(weight of the product in the present invention−weight of substances can't be dissolved in acid)/weight of the product in the present invention×100%. The conditions of the acid dissolubility test include: pH=2, time=2 h.

The water absorptivity and acid dissolubility of the temporary plugging agents prepared in the examples 1-8 and the comparative examples 1-9 are tested. The results are shown in Table 1.

TABLE 1

| Degradable starch-based temporary plugging agent for drilling fluid | Distilled water absorption multiple/g · g − 1 | Acid dissolubility/% |
| --- | --- | --- |
| Example 1 | 110.53 | 89.13 |
| Example 2 | 116.61 | 80.69 |
| Example 3 | 127.85 | 81.03 |
| Example 4 | 120.26 | 81.96 |
| Example 5 | 122.78 | 84.23 |
| Example 6 | 115.21 | 88.25 |
| Example 7 | 118.09 | 83.61 |
| Example 8 | 126.43 | 91.74 |
| Comparative example 1 | 1.2 | 0 |
| Comparative example 2 | 1 | 0 |
| Comparative example 3 | 1.6 | 0 |
| Comparative example 4 | 78.64 | 69.17 |
| Comparative example 5 | 64.21 | 66.83 |
| Comparative example 6 | 70.45 | 73.63 |
| Comparative example 7 | 95.28 | 78.67 |
| Comparative example 8 | 70.88 | 61.53 |
| Comparative example 9 | 58.15 | 10.25 |

It is seen from Table 1: the degradable starch-based temporary plugging agents S1-S8 for drilling fluid in the present invention have strong water absorptivity, with water absorption multiple equal to or higher than 110 g/g; in addition, the product has high acid dissolubility, and the acid dissolubility is 80% or higher in hydrochloric acid with pH=2 within 2 h; in contrast, the temporary plugging agents D1-D9 prepared in the comparative examples 1-9 have water absorptivity lower than 2 g/g; in addition, the acid dissolubility in hydrochloric acid with pH=2 within 2 h is 0%; apparently, the degradable starch-based temporary plugging agent for drilling fluid in the present invention have adaptive plugging property and potential acidified plugging removal property.

Test Case 2

Environmental Friendliness and Biodegradability

The COD and $BOD_5$ of the degradable starch-based temporary plugging agent for drilling fluid are tested to evaluate the environmental friendliness, wherein the COD refers to chemical oxygen demand, and is an important index for evaluating the level of pollution of the water sample; the $BOD_5$ refers to biochemical oxygen demand, reflects the content of organic pollutants, and may be used to evaluate the biodegradability of sewage and waste water.

The $BOD_5/COD$ value may be used to judge the biodegradability of the sample:

$BOD_5/COD \geq 45\%$: highly biodegradable;
$30\% \leq BOD_5/COD < 45\%$: biodegradable;
$BOD_5/COD < 30\%$: hardly biodegradable The environment friendliness of the temporary plugging agents prepared in the examples 1-8 and the comparative examples 1-9 is tested. The results are shown in Table 2.

TABLE 2

| Sample | COD/g·m $L^{-1}$ | $BOD_5$/g·m $L^{-1}$ | $BOD_5$/ COD | Biodegradability |
|---|---|---|---|---|
| Example 1 | 225.6 | 82.9 | 36.75% | Biodegradable |
| Example 2 | 182.3 | 69.3 | 38.01% | Biodegradable |
| Example 3 | 246.1 | 92.7 | 37.67% | Biodegradable |
| Example 4 | 190.4 | 81.4 | 42.75% | Biodegradable |
| Example 5 | 218.9 | 77.8 | 35.54% | Biodegradable |
| Example 6 | 204.7 | 73.3 | 35.81% | Biodegradable |
| Example 7 | 198.7 | 72.5 | 36.49% | Biodegradable |
| Example 8 | 265.2 | 81.8 | 30.84% | Biodegradable |
| Comparative example 1 (FC-9) | 1847.4 | 0.22 | 0.01% | Hardly biodegradable |
| Comparative example 2 (DF-1) | 108.6 | 17.1 | 15.75% | Hardly biodegradable |
| Comparative example 3 (TJ-1) | 3882.2 | 0.72 | 0.02% | Hardly biodegradable |
| Comparative example 4 | 176.75 | 64.3 | 36.38% | Biodegradable |
| Comparative example 5 | 239.2 | 77.1 | 32.23% | Biodegradable |
| Comparative example 6 | 210.92 | 66.7 | 31.62% | Biodegradable |
| Comparative example 7 | 229.81 | 72.5 | 31.55% | Biodegradable |
| Comparative example 8 | 215.16 | 67.8 | 31.51% | Biodegradable |
| Comparative example 9 | 1061.49 | 0.42 | 0.04% | Hardly biodegradable |

It is seen from Table 2: according to the COD, $BOD_5$, and $BOD_5/COD$ values of the degradable starch-based temporary plugging agent S1-S8 for drilling fluid in the present invention, all of S1-S8 are biodegradable; in contrast, the temporary plugging agents D1-D3 prepared in the comparative examples 1-3 and the temporary plugging agent D9 in the comparative example 9 are hardly biodegradable; apparently, the degradable starch-based temporary plugging agent for drilling fluid in the present invention is biodegradable and has good environment friendliness.

Test Case 3

The biodegradability of the product is further evaluated.

Non-biodegradable PVC material is selected; the temporary plugging agents prepared in the examples 1-8 and the comparative examples 1-9 are added respectively when PVC films are prepared; the degradation of the obtained materials in soil can be observed and measured. The specific experimental method is as follows: 10 g PVC powder is dissolved in 40 mL tetrahydrofuran; for each of the temporary plugging agents prepared in the examples 1-8 and the comparative examples 1-9, 10 g temporary plugging agent is taken and slowly added into the solution; the mixture is stirred to a homogeneous state and the poured onto a smooth glass plate and dried at 40° C.; the obtained sample is sheared into a 1×1 cm block shape, and the weight of the block is logged. Fresh soil in appropriate amount is poured into a wide-neck flask, the prepared sample is buried in the soil, then the wide-neck flask is placed in a thermostatic oven at 30° C. and 100° C., with or without air, respectively. A sample is taken out from the oven on 30 d, 60 d, 90 d, rinsed with ethanol solution gently to remove foreign substances, washed with distilled water for several time, and then dried to a constant weight state; then the degradation ratio X is calculated. The degradation ratio X is calculated with the following formula:

$$X = \frac{(1-c)m_0 - (m_1 - m_0 c)}{(1-c)m_0} \times 100\%, \quad (1);$$

Where in the formula (1), X is degradation ratio; $m_0$ is the initial weight of the sample, in unit of g; $m_1$ is the weight of the sample after degradation, in unit of g; c is the mass percent of the PVC, %.

The results of biodegradability test of the temporary plugging agents prepared in the examples 1-8 and comparative examples 1-9 are shown in Table 3.

TABLE 3

| Degradation ratio | 30° C., with air | 30° C., without air | 100° C., with air | 100° C., without air |
|---|---|---|---|---|
| Example 1 + 30 d | 13.87 | 10.26 | 22.91 | 20.38 |
| Example 1 + 60 d | 39.51 | 35.76 | 45.93 | 36.23 |
| Example 1 + 90 d | 52.91 | 50.03 | 56.88 | 56.51 |
| Example 2 + 90 d | 57.76 | 53.14 | 63.54 | 59.09 |
| Example 3 + 90 d | 52.89 | 50.00 | 58.18 | 54.11 |
| Example 4 + 90 d | 54.78 | 50.40 | 60.26 | 56.04 |
| Example 5 + 90 d | 58.63 | 53.94 | 64.49 | 59.98 |
| Example 6 + 90 d | 55.88 | 51.41 | 61.47 | 57.17 |
| Example 7 + 90 d | 56.63 | 52.10 | 62.29 | 57.93 |
| Example 8 + 90 d | 53.23 | 50.94 | 58.55 | 54.45 |
| comparative example 1 + 90 d | 6.59 | 6.06 | 7.25 | 6.74 |
| comparative example 2 + 90 d | 4.35 | 4.00 | 4.79 | 4.45 |
| comparative example 3 + 90 d | 38.58 | 35.49 | 42.44 | 39.47 |
| comparative example 4 + 90 d | 49.34 | 45.39 | 54.27 | 50.47 |
| comparative example 5 + 90 d | 53.12 | 48.87 | 58.43 | 54.34 |
| comparative example 6 + 90 d | 52.76 | 48.54 | 58.04 | 53.97 |
| comparative example 7 + 90 d | 48.45 | 44.57 | 53.30 | 49.56 |
| comparative example 8 + 90 d | 54.31 | 49.97 | 59.74 | 55.56 |
| comparative example 9 + 90 d | 7.24 | 6.66 | 7.96 | 7.41 |

It is seen from Table 3: under different temperature and air conditions, the degradation ratios of the degradable starch-based temporary plugging agents S1-S8 for drilling fluid in the present invention in soil after 90 days are 50% or higher; in contrast, under different temperature and air conditions, the degradation ratios of the temporary plugging agents D1, D2 and D9 prepared in the comparative examples 1, 2 and 9 in soil after 90 days are lower than 10%; apparently, the degradable starch-based temporary plugging agent for drilling fluid in the present invention has high biodegradability.

Test Case 4

Plugging Performance and Bearing Capacity 1.5 wt % product obtained in the example 1 is added into 4 wt % bentonite mud, and the plugging performance and bearing capacity of the product in the present invention is evaluated by testing the plugging strength of the product in sand beds compacted from sand in different average particle diameters. The sand used in the test includes sand in average particle diameter smaller than 20 mesh, sand in 20-40 mesh average particle diameter, sand in 40-60 mesh average particle diameter, sand in 60-80 mesh average particle diameter, sand in 100-200 mesh average particle diameter, and sand in average particle diameter greater than 200 mesh, to simulate formations different in porosity. The evaluation results are shown in Table 4.

TABLE 4

| Mesh size of sand | Experimental results at different pressure values (MPa) | | | |
|---|---|---|---|---|
| | 1 MPa | 2 MPa | 3 MPa | 4 MPa |
| <20 mesh | Penetrate within 2 min. | Penetrate quickly | Penetrate quickly | Penetrate quickly |
| 20-40 mesh | Fail to penetrate within 30 min. | Penetrate within 25 min., 4.1 mL lost | Penetrate within 22 min., 9.1 mL lost | Penetrate under pressure within 16 min., 16.7 mL lost |
| 40-60 mesh | Fail to penetrate within 30 min. | Fail to penetrate within 30 min. | Penetrate within 28 min., 1.2 mL lost | Penetrate under pressure within 26 min., 5.2 mL lost |
| 60-80 mesh | Fail to penetrate within 30 min. | Fail to penetrate within 30 min. | Fail to penetrate within 30 min. | Fail to penetrate within 30 min. |
| 80-100 mesh | Fail to penetrate within 30 min. | Fail to penetrate within 30 min. | Fail to penetrate within 30 min. | Fail to penetrate within 30 min. |
| 100-200 mesh | Fail to penetrate within 30 min. | Fail to penetrate within 30 min. | Fail to penetrate within 30 min. | Fail to penetrate within 30 min. |
| >200 mesh | Fail to penetrate within 30 min. | Fail to penetrate within 30 min. | Fail to penetrate within 30 min. | Fail to penetrate within 30 min. |

It is seen from Table 4: in the case that the mesh size of the sand is smaller than 60 mesh, the sand bed penetration rate of the bentonite mud at 4 MPa pressure is quicker and the filtrate loss is more as the average particle diameter of the sand is decreased; in the case that the mesh size of the sand is greater than 60 mesh, the drilling fluid can't penetrate the sand bed, and the temporary plugging layer can bear pressure up to 4 MPa.

In addition, the temporary plugging agents prepared in the examples 2-8 and the comparative examples 1-9 in the present invention are tested according to the test case 4. The results are as follows: the temporary plugging agent S2-S8 prepared in the examples 2-8 in the present invention can bear pressure up to 4 MPa, while the temporary plugging agents prepared in the comparative examples 1-9 can bear pressure up to 1 MPa only.

Test Case 5
Adaptive Plugging and Plugging Removal Properties of the Temporary Plugging Agent 1 wt % product obtained in the example 1 is added into 4 wt % bentonite mud and the resultant mud is used as the test mud, well cores with permeability lower than 1 mD (well core 1#), within the range of 1-50 mD (well core 2#), and greater than 50 mD (well core 3#) are selected, and the initial permeability is denoted as $K_{g1}$. The well core is contaminated for 2 h under 90° C./3.5 MPa condition and tested with a high-temperature high-pressure dynamic filtration simulator, to test the pressure difference and confining pressure at the initial permeability and the permeability $K_{g2}$ of the well core after contamination. The contaminated well core is treated with 10% hydrochloric acid for 2 h, and then the permeability $K_{g3}$ is tested. $K_{g2}/K_{g1}$ is the temporary plug-ging ratio at the permeability, and $K_{g3}/K_{g1}$ is the core permeability recovery ratio. The experimental results are shown in Table 5.

TABLE 5

| Well Core No. | Length/ cm | Diameter/ cm | Porosity | $K_{g1}$/ $10^{-3}$ $\mu m^2$ | $K_{g2}$/ $10^{-3}$ $\mu m^2$ | Temporary plugging ratio/% | $K_{g3}$/ $10^{-3}$ $\mu m^2$ | $R_d$/ % |
|---|---|---|---|---|---|---|---|---|
| 1# | 2.92 | 2.51 | 12.84% | 0.147 | 0 | 100 | 0.133 | 90.48 |
| 2# | 3.37 | 2.5 | 11.96% | 35.643 | 0 | 100 | 32.804 | 92.03 |
| 3# | 2.81 | 2.5 | 17.45% | 109.788 | 0 | 100 | 96.947 | 88.30 |

It is seen from Table 5: the temporary plugging agent prepared in the example 1 in the present invention attains a good plugging effect for well cores different in permeability, the permeability $K_{g2}$ of the contaminated well core measured at the test pressure difference at the initial permeability is always 0, and the temporary plugging ratio is 100%, indicating that the reservoir damage can be reduced effectively. For well cores different in permeability, the permeability recovery ratio is 88.30% or higher after acidified plugging removal; moreover, for well cores with lower permeability and lower porosity, the permeability recovery ratio is as high as 90.48% or above. The results demonstrate that the product prepared in the example 1 has adaptive plugging ability and plugging removal ability for formations when it is used as a temporary plugging agent.

In addition, the temporary plugging agents prepared in the examples 2-8 and the comparative examples 1-9 in the present invention are tested according to the test case 5. The results are as follows: when the temporary plugging agents S2-S8 prepared in the examples 2-8 in the present invention are used as test slurries, the initial permeability $K_{g1}$ tested in a well core with permeability lower than 1 mD (well core 1#) is between $0.14 \times 10^{-3}$ $\mu m^2$ and $0.58 \times 10^{-3}$ $\mu m^2$; the initial permeability $K_{g1}$ tested in a well core with permeability within 1-50 mD range (well core 2#) is between $18.34 \times 10^{-3}$ $\mu m^2$ and $47.91 \times 10^{-3}$ $\mu m^2$; the initial permeability $K_{g1}$ tested in a well core with permeability higher than 50 mD (well core 3#) is between $77.64 \times 10^{-3}$ $\mu m^2$ and $109.31 \times 10^{-3}$ $\mu m^2$; in contaminated well cores, the permeability $K_{g2}$ measured at the test pressure difference at the initial permeability is always 0, and the temporary plugging ratio is 100%, indicating that the reservoir damage can be reduced effectively. For well cores different in permeability, the permeability recovery ratio is 88.30% or higher after acidified plugging removal; for well cores with lower permeability and lower porosity, the permeability recovery ratio is even 90.48% or higher.

In contrast, when the temporary plugging agents prepared in the comparative examples 1-9 are used as test slurries, the initial permeability $K_{g1}$ tested in a well core with permeability lower than 1 mD (well core 1#) is between $0.21 \times 10^{-3}$ $\mu m^2$ and $0.56 \times 10^{-3}$ $\mu m^2$; the initial permeability $K_{g1}$ tested in a well core with permeability within 1-50 mD range (well core 2#) is between $31.82 \times 10^{-3}$ $\mu m^2$ and $49.24 \times 10^{-3}$ $\mu m^2$; the initial permeability $K_{g1}$ tested in a well core with permeability higher than 50 mD (well core 3#) is between $64.37 \times 10^{-3}$ $\mu m^2$ and $90.54 \times 10^{-3}$ $\mu m^2$; in contaminated well cores, the permeability $K_{g2}$ measured at the test pressure difference at the initial permeability is between $0.14 \times 10^{-3}$ $\mu m^2$ and $1.76 \times 10^{-3}$ $\mu m^2$, the temporary plugging ratio is 91.42-99.99%; for well cores different in permeability, the permeability recovery ratio is only 50.51-80.21% after acidified plugging removal; for well cores with lower permeability and lower porosity, the permeability recovery ratio is only 47.76-80.72%.

Therefore, the products prepared in the examples 1-8 have adaptive plugging ability and plugging removal ability for formations when they are used as temporary plugging agents.

Test Case 6

Influence of the degradable starch-based temporary plugging agent for drilling fluid on the performance of bentonite mud.

4 wt % bentonite mud is used as base mud, the product prepared in the example 1 is added in different amounts, and then the performance of the bentonite mud is tested respectively. The results are shown in Table 6.

TABLE 6

| Sample | AV/ mPa·s | PV/ mPa·s | YP/ Pa | G10"/ Pa | G10'/ Pa | API/ mL |
|---|---|---|---|---|---|---|
| 4 wt % base mud + 0.5 wt % product prepared in the example 1 | 9 | 8 | 1 | 1 | 5.5 | 7.2 |
| 4 wt % base mud + 1 wt % product prepared in the example 1 | 27 | 21 | 6 | 0.5 | 5 | 4.2 |
| 4 wt % base mud + 1.5 wt % product prepared in the example 1 | 40.5 | 25 | 15.5 | 0.5 | 5 | 3.6 |

In Table 6, AV represents apparent viscosity, PV represents plastic viscosity, YP represents yield point, Gel represents gel strength, and API represents filtrate loss at normal temperature and normal pressure.

It is seen from Table 6: as the amount of the product provided in the present invention is increased, the apparent viscosity is increased, the plastic viscosity is increased, the yield point is increased, and the filtrate loss is decreased. Apparently the product provided in the present invention can work with the clay particles in the base mud to form a grid structure, and thereby attains a tackifying effect as well as a filtrate loss reduction effect. In view that the apparent viscosity is too high when the content of the product in the drilling fluid is 1.5 wt %, the content of the product in the drilling fluid should be about 1 wt %.

In summary, the temporary plugging agent provided in the present invention is biodegradable, can be degraded by 50% or more within 90 days in soil, and is environment friendly; a water-based drilling fluid with the temporary plugging agent has excellent rheological and filtrate loss properties, and can achieve 100% adaptive temporary plugging for formations different in permeability; besides, the temporary plugging agent provided in the present invention has high acid dissolubility, and the permeability recovery ratio can be 85% or higher after acidified plugging removal. Therefore, the temporary plugging agent has outstanding reservoir protection performance. The temporary plugging agent provided in the present invention is a temporary plugging agent for drilling fluid, which has adaptive temporary plugging ability as well as environment friendliness, and has outstanding reservoir protection ability also.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A temporary plugging agent for drilling fluid, wherein the temporary plugging agent obtained by controlling gelatinized starch and a vinyl grafted monomer to have a polymerization reaction in an activator solution in the presence of a cross-linking agent and an initiator, wherein the vinyl grafted monomer comprises acrylic acid, acrylamide, and 2-acrylamide-2-methyl propanesulfonic acid; the gelatinized starch is obtained by adding starch into deionized water to have a gelatinization reaction, wherein based on 100 parts by weight deionized water, the starch is in 1-5 parts by weight, the vinyl grafted monomer is in 5-9 parts by weight, the initiator is in 0.5-1 parts by weight, the cross-linking agent is in 0.2-1 parts by weight, and the activator is in 0.1-3 parts by weight.

2. The temporary plugging agent according to claim 1, wherein the mass ratio of the acrylic acid to the acrylamide to the 2-acrylamide-2-methyl propanesulfonic acid is (0.5-4):(0.5-2):1.

3. The temporary plugging agent according to claim 1, wherein the cross-linking agent is N,N-dimethylacrylamide; and the initiator is ammonium persulfate.

4. The temporary plugging agent according to claim 1, wherein the activator solution is obtained by controlling an activator to contact with calcium carbonate in deionized water; wherein, based on 100 parts by weight deionized water, the calcium carbonate is at 1-5 parts by weight.

5. The temporary plugging agent according to claim 4, wherein the activator is at least one of hexadecyl trimethyl ammonium bromide, gemini surfactant, silicone surfactant, octyl dihydroxyethoxyamine, ditetradecyl sulphobetaine, and sodium stearate.

6. The temporary plugging agent according to claim 4, wherein the calcium carbonate is in 5-25 μm average particle diameter and/or 30-100 nm average particle diameter.

7. The temporary plugging agent according to claim 6, wherein the mass ratio of the content of the calcium carbonate in 5-25 μm average particle diameter to the content of the calcium carbonate in 30-100 nm average particle diameter is 1-2:1.

8. The temporary plugging agent according to claim 6, wherein the average particle diameter of the calcium carbonate is 30-100 nm.

9. A method for preparing the temporary plugging agent according to claim 1, comprising:
(1) adding starch into deionized water to have a gelatinization reaction to obtain gelatinized starch;
(2) controlling an activator to contact with carbonic acid to obtain an activator solution; and
(3) controlling the gelatinized starch and the vinyl grafted monomer to have a polymerization reaction in the activator solution in the presence of a cross-linking agent and an initiator.

10. The preparation method according to claim 9, wherein in the step (1), the conditions of the gelatinization reaction include: gelatinizing for 20-40 min at 60-80° C. under nitrogen shielding.

11. The preparation method according to claim 9, wherein in the step (2), the conditions of the controlling an activator to contact with carbonic acid include: adding a calcium carbonate solution dropwise at 2-3 g/min into the activator under stirring at 600-1,000 rpm, wherein the calcium carbonate solution comprises the carbonic acid.

12. The preparation method according to claim 9, wherein in the step (3), the conditions of the polymerization reaction include: 40-60° C. reaction temperature and 2-4 h reaction time.

13. A water-based drilling fluid containing the temporary plugging agent according to claim 1.

14. The water-based drilling fluid according to claim 13, wherein based on the total weight of 100 mL water-based drilling fluid, the content of the temporary plugging agent is 0.5-1.5 wt %.

15. A method of drilling in oil and gas fields comprising adding the temporary plugging agent according to claim 1 into a drilling fluid for the drilling in oil and gas fields.

16. The method according to claim 15, wherein the drilling fluid comprises a base mud, and the temporary plugging agent forms a grid structure with clay particles in the base mud.

17. The method according to claim 16, wherein the base mud is a 4 wt. % bentonite mud, and the content of the temporary plugging agent is 1-1.5 wt. %.

* * * * *